Patented Aug. 2, 1932

1,869,782

UNITED STATES PATENT OFFICE

WOLDEMAR M. STERNBERG, OF OAK PARK, ILLINOIS, ASSIGNOR OF ONE-HALF TO EPSTEIN & HARRIS, A COPARTNERSHIP CONSISTING OF ALBERT K. EPSTEIN AND BENJAMIN R. HARRIS, OF CHICAGO, ILLINOIS

LIP STICK

No Drawing.  Application filed January 16, 1926. Serial No. 81,834.

My invention relates to lip sticks and a method of making the same, being directed more particularly to lip sticks such as are at present in common use.

One of the features of my invention is the production of a lip stick composed of materials in which a coloring matter is carried adapted for staining the skin by the application of a thin coating of the body substance from which the dye or coloring matter is absorbed by the skin. Thus instead of merely applying a coating of a colored mixture as heretofore, the dye or coloring matter stains the lips and is thus more permanent.

Lip sticks as heretofore manufactured were mostly composed of oil soluble dyes carried in an oily base so that the lip sticks when applied leave a layer of a colored mixture of waxes, oils or similar material, and of such character that there is usually little, and frequently no staining. Therefore the color effect from their application lasts only about as long as the fatty layer remains. In such lip sticks this layer of material is readily washed off or removed by hot fluids or foods as well as mechanically, by moving the lips or touching them, and thus the coloring effect disappears.

By my improved product I provide a composition which combines a curative and chap preventative action, together with an actual staining of the lips.

To the above end I preferably use suitable water soluble dyes mixed with an inert material such as talc and kaolin, which gives added strength or body to the stick, the whole held together by the waxy and fatty material employed. This body material also acts as a diluent for the coloring matter to more effectively disperse the same and to prevent too intensive or spotty staining. With this inert body material I intermix a suitable dye for staining the lips, preferably using water soluble dyes which when applied to the wet lips will readily stain them. As a dye or staining material I preferably use dry matter, so that it may be better intermixed with the body material without being absorbed by the same but rather to be suspended therein or commingled therewith. I also add to the dry material a suitable binder so that the mixed matter may be compressed into self-sustaining sticks. The binder is preferably composed of one or more materials which are non-solvent for the water soluble dyes or coloring matter, and which binder material is solid at normal temperature but readily fusible so that it may be well incorporated with the structure or body material and dyes.

Thus in the preferred composition I use a suitable structure or body material, which also acts as a diluent for the coloring matter; suitable water soluble dyes preferably in a dry state, and a readily fusible binder non-solvent for the water soluble dyes or coloring matter, all well intermixed above the fusing or softening temperature of the binder so that the composition may then be compressed into self-sustaining sticks, after which they are cooled to normal temperature and retain their shape.

For the structure or body material a number of substances may be used, such as talc, clay, kaolin or bentonite, all of which also act as diluents of color. For this material I preferably use one which is chemically and physiologically inert so that it will not affect the materials with which it is combined, or be affected by them, or be harmful to the skin, but which will give added strength to the body over the use of the waxy or oily materials alone.

For coloring matter I preferably use dry substances which are preferably water soluble dyes of the kind known to be harmless. I preferably use dyes which are water soluble but non-solvent in waxes or fats, as it is desirable that the dyes be suspended or dispersed in the body of the stick, rather than to be absorbed by the body material, so that the dyes will readily stain the lips and not merely coat them with a colored surface. The dyes to be used depend to a great extent upon the intensity or shade required. For this purpose I have found a number of dyes suitable, such as ponceau 3R, amaranth, specially purified eosine-Y, and tartarzine. I also find oxide of zinc a desirable addition, as it not only brings out the color in the sticks but also has healing properties.

As to the binder, I preferably use one which is nonsolvent for the water soluble dyes or coloring matter and which is also readily fusible, that is which is solid at normal temperature but melts with heat at a temperature below that at which dyes may be decomposed by heat, to be incorporated or intermixed with the body and coloring substances to bind them all into one homogeneous mass. This binder should also be one which will permit the material of the stick to come off more readily and spread more evenly over the lips, so as to not only more evenly stain them but cover them with a thin layer of protective, healing and non-chap substance. To this end I have found a number of materials satisfactory, such as paraffin, beeswax, carnauba wax, petrolatum and sulphonated oil. I have found sulphonated oil to be a most desirable addition to the fatty base of the lipstick, assisting in the dispersion of the composition on the skin.

In general it might be stated that the composition should include a sufficient proportion of suitable structure or body material to act as an effective diluent for the coloring matter and held together by a proportion of binding material which will give a composition soft enough to readily rub off when gently rubbed against the wet skin of the lips, but hard enough to furnish strength so that the stick will be self-sustaining when at normal temperature.

The following formula is one which I have found to give most excellent results:

| | |
|---|---|
| Talc | 26.7% |
| Kaolin | 13.3 |
| Ponceau 3R | 10.9 |
| Amaranth | 6.3 |
| Yellow ochre | 17.1 |
| Oxide of zinc | 5.7 |
| Paraffin | 3.6 |
| Beeswax | 5.9 |
| Carnauba wax | 2.4 |
| Sulphonated oil | 4.7 |
| Petrolatum | 3.4 |
| | 100.0 |

In compounding the above formula and then producing the finished lip stick, I preferably thoroughly intermix the structure or body material consisting of the talc and kaolin and add thereto the dry coloring matter including the ponceau, amaranth and yellow ochre. The oxide of zinc is also added, all of these solids being preferably ball milled before incorporating the binder.

To incorporate the binder I preferably fuse the paraffin, beeswax, carnauba wax, sulphonated oil and petrolatum, melting these materials and thoroughly intermixing them. I now add this binder or fatty base to the dry or solid materials, mixing them at a temperature above the melting point of the binder. That is, at a temperature that will keep the binder fluid until a thorough intermixing or commingling of the various ingredients has been accomplished. For this purpose I find a heated water jacketed mixer or a heat jacketed paint mill very effective to insure the proper commingling of the ingredients, with the mixture being kept at a temperature sufficiently above the melting point of the binder to keep it fluid.

The mass is mixed until plastic, when it is next formed into suitable sticks, and for this purpose an extrusion press kept at a suitable temperature is most satisfactory for compressing or extruding the material through dies of suitable shape which it leaves in continuous rods which may be cut into suitable lengths, beveled and mounted in holders.

Another formula prepared and found most satisfactory had the following composition: ZnO 4.1 p., talc 45.2 p., yellow ochre 11.7 p., certified amaranth 4.8, specially purified eosine-Y 6.3 p., certified tartarzine 2.5 p., borax 0.5 p., petrolatum 11.2 p., beeswax 6.2 p., paraffin 5.0 p., carnauba wax 2.5 p. Another preparation which also proved highly satisfactory consisted of: ponceau 3R 9.5 p., amaranth 5.5%; bentonite 45%; ZnO 5%; ochre 10%; paraffin 4.0%; beeswax 5%; carnauba wax 2% and petrolatum 9%. Of course, the compositions given here are merely given by way of example and I do not limit myself to the above given formulæ. Many other suitable combinations of the above materials are considered within the scope of my invention.

In the use of the lip stick, the lips are first moistened with the tongue and the stick then gently rubbed across the wet surface, applying a thin coating of the color carrying material. As previously stated, the dyes used are water soluble and are suspended in the waxy or fatty material of the stick so that the dye material carried by the thin coating is dissolved and stains the lips. This leaves a thin protective coating on the surface of the lips, but because of their being stained they retain the color even though the waxy or fatty coating is wiped off or dissolved, such as by hot liquids or foods. The lips retain their color because of the stain. I have found that a stick of the character disclosed herein is thus of a more permanent character, and although the stain may be removed, or will disperse in time, it is of a more permanent character than that of the lip sticks heretofore provided.

What I claim as new and desire to secure by United States Letters Patent is:—

1. A lipstick composed of siliceous materials, water soluble dye materials, and a binder composed of substances which are solid at ordinary room temperatures, readily fusible and non-soluble in respect to the water soluble dye materials, the lipstick being self-sustaining and being adapted to apply a uniform semi-permanent color to the lips when applied thereto after the lips are wetted.

2. A lipstick composed of siliceous materials, water soluble dye materials, and a binder composed of substances which are solid at ordinary room temperatures, readily fusible and non-soluble in respect to the water soluble dye materials, the lipstick being self-sustaining and being adapted to apply a uniform semi-permanent color to the lips when applied thereto after the lips are wetted, said siliceous materials, dye materials and binder being present in proportions of approximately 45%, 35%, and 20% respectively.

3. A lipstick composed of siliceous materials, water soluble dye materials, and a binder composed of substances which are solid at ordinary room temperatures, readily fusible and non-soluble in respect to the water soluble dye materials, the lipstick being self-sustaining and being adapted to apply a uniform semi-permanent color to the lips when applied thereto after the lips are wetted, said binder constituting approximately 20% of the total amount of materials.

In witness whereof, I hereunto subscribe my name this sixth day of January, 1926.

WOLDEMAR M. STERNBERG.